(12) United States Patent
Becker

(10) Patent No.: US 11,441,438 B2
(45) Date of Patent: Sep. 13, 2022

(54) BLEED AIR EXTRACTION DEVICE FOR A GAS TURBINE ENGINE

(71) Applicant: Rolls-Royce Deutschland Ltd & Co KG, Blankenfelde-Mahlow (DE)

(72) Inventor: Bernd Becker, Berlin (DE)

(73) Assignee: ROLLS-ROYCE DEUTSCHLAND LTD & CO KG, Blankenfelde-Mahlow (DE)

(*) Notice: Subject to any disclaimer, the term of this patent is extended or adjusted under 35 U.S.C. 154(b) by 168 days.

(21) Appl. No.: 16/855,503

(22) Filed: Apr. 22, 2020

(65) Prior Publication Data

US 2020/0386109 A1 Dec. 10, 2020

(30) Foreign Application Priority Data

Apr. 26, 2019 (DE) .................... 10 2019 110 829.2

(51) Int. Cl.
*F01D 9/06* (2006.01)
*F01D 9/04* (2006.01)
(Continued)

(52) U.S. Cl.
CPC .............. *F01D 9/06* (2013.01); *F01D 9/041* (2013.01); *F04D 27/0215* (2013.01);
(Continued)

(58) Field of Classification Search
CPC .... F01D 9/041; F01D 9/06; F02C 6/08; F02C 9/18; F04D 27/0215; F04D 27/023;
(Continued)

(56) References Cited

U.S. PATENT DOCUMENTS 6,438,941 B1 8/2002 Elliott et al.
9,322,337 B2 * 4/2016 Little .................... F02C 9/18
(Continued)

FOREIGN PATENT DOCUMENTS

| EP | 0638275 A1 | 2/1995 |
| EP | 1136679 A2 | 9/2001 |
| WO | 2006009142 A1 | 1/2006 |

OTHER PUBLICATIONS

German Search Report dated Dec. 18, 2019 for counterpart German Patent Application No. 10 2019 110 829.2.

*Primary Examiner* — Jesse S Bogue
(74) *Attorney, Agent, or Firm* — Shuttleworth & Ingersoll, PLC; Timothy Klima

(57) ABSTRACT

The invention relates to a bleed air extraction device for a turbomachine, which has: an axial compressor, formed in a flow path and having at least one compressor stage, which comprises a rotor and a stator, and a bleed air duct, which is provided and designed to guide a bleed air flow branched off from the flow path of the axial compressor. In this case, the bleed air duct comprises an inlet opening, which is formed downstream of a stator of the axial compressor in the radially outer flow path boundary, an axially forward wall adjoining the inlet opening, and an axially rearward wall adjoining the inlet opening. Guide means are provided, which are provided and designed for the purpose of guiding at least a portion of the bleed air flow branched off from the flow path in the direction of the axially forward wall of the bleed air duct.

6 Claims, 11 Drawing Sheets

(51) Int. Cl.
*F04D 27/02* (2006.01)
*F04D 29/54* (2006.01)
*F02C 9/18* (2006.01)

(52) U.S. Cl.
CPC .............. *F04D 29/542* (2013.01); *F02C 9/18* (2013.01); *F04D 27/023* (2013.01); *F05D 2220/323* (2013.01); *F05D 2220/3217* (2013.01); *F05D 2240/12* (2013.01)

(58) Field of Classification Search
CPC ........... F04D 29/542; F05D 2220/3217; F05D 2220/323; F05D 2240/12; F05D 2240/80; Y02T 50/60
See application file for complete search history.

(56) References Cited

U.S. PATENT DOCUMENTS

| | | | | |
|---|---|---|---|---|
| 10,451,083 B2 * | 10/2019 | Wilshaw | ............... | F01D 25/243 |
| 2007/0137175 A1 * | 6/2007 | Moniz | ................... | F01D 17/105 |
| | | | | 60/785 |
| 2018/0313364 A1 * | 11/2018 | Moeckel | ............... | F04D 29/542 |

* cited by examiner

BLEED AIR EXTRACTION DEVICE FOR A GAS TURBINE ENGINE

This application claims priority to German Patent Application DE102019110829.2 filed Apr. 26, 2019, the entirety of which is incorporated by reference herein.

The invention relates to a bleed air extraction device for a gas turbine engine as disclosed herein.

The practice of taking bleed air from a compressor of a gas turbine engine is known. There are many reasons for this. For example, bleed air is extracted in order to vary the mass flow through the compressor and to optimize the latter in respect of its aerodynamic stability. Another reason can consist in using compressed air tapped off from the compressor to drive compressed air motors and/or compressed air turbines. Bleed air is furthermore used, for example, to deice wing leading edges of the aircraft, to deice engine components and to supply pressure to and air condition the aircraft cabin. In general, a distinction is drawn between low-pressure bleed air and high-pressure bleed air for driving auxiliary devices on the engine and on the aircraft and pure bleed air, which goes overboard and contributes to the stability of the compressor.

In all cases mentioned, the aim should be to implement the deflection of the flow from the flow path of the compressor into the bleed air duct in a manner which is as effective as possible and with few aerodynamic losses.

In this case, one problem is that the bleed air extraction geometries must cover a large range of bleed air rates, which are not required continuously. In the case of small extraction rates, the flow tends to separate in the bleed air duct, which has been designed for the maximum rate. The backflow which arises in the bleed air duct can extend as far as the flow path of the compressor and can cause a significant disturbance to the main flow through interaction. As a consequence, the stage matching of the compressor changes and the blockage losses increase. Moreover, the static pressures for the secondary air system fall due to the backflow.

EP 0 638 725 A1 and WO 2006/091142 A1 disclose the arrangement of profiles in the bleed air duct, which serve to divert the flow in the flow path with low losses.

It is the underlying object of the present invention to provide a bleed air extraction device for a gas turbine engine with an extraction geometry which allows improved flow through the bleed air duct and, at the same time, avoids or at least reduces backflow of bleed air into the flow duct in the case of small extraction rates.

This object is achieved by means of a device having features as disclosed herein. Refinements of the invention are also disclosed in the present disclosure.

According to these, the present invention considers a bleed air extraction device for a turbomachine, which has an axial compressor, formed in a flow path and having at least one compressor stage, wherein the compressor stage comprises a rotor and a stator. The flow path is bounded radially on the inside by a radially inner flow path boundary and radially on the outside by a radially outer flow path boundary. The device furthermore comprises a bleed air duct, which is provided and designed to guide a bleed air flow branched off from the flow path of the axial compressor. The bleed air duct typically guides the branched-off bleed air flow to a collecting volume of a secondary air system, from which the bleed air is distributed further. The bleed air duct comprises an inlet opening, which is formed downstream of a rotor or stator of the axial compressor in the radially outer flow path boundary, an axially forward wall adjoining the inlet opening, and an axially rearward wall adjoining the inlet opening.

The solution according to the invention envisages the provision of guide means which guide at least a portion of the bleed air flow branched off from the flow path in the direction of the axially forward wall of the bleed air duct. In this case, the guide means comprise at least one flow-guiding body, which is designed in such a way that it guides bleed air flow in the direction of the axially forward wall of the bleed air duct.

The present invention is based on the insight that the axially forward wall of the bleed air duct forms a low-momentum zone which contributes only ineffectively to the deflection and guidance of the bleed air. The present invention provides effective bleed air extraction based on this insight in that guide means are provided which guide the flow deflected into the bleed air duct from the flow path of the compressor to a greater extent against the upstream wall of the bleed air duct. In this case, the momentum is received from the flow path of the compressor and directed into the bleed air duct in a manner controlled by the guide means. As a result, there is better through flow along the axially forward wall of the bleed air duct, and therefore a low-momentum zone cannot form at all or cannot form to such a great extent.

The solution according to the invention is thus associated with the advantage that, at low bleed air rates, the backflow areas at the axially forward duct wall are reduced by the introduction of momentum in the area of the low-momentum zones at the axially forward duct wall. Pressure losses during the deflection of the flow into the bleed air duct can thereby be avoided or reduced, with the result that a static pressure recovery that preferably takes place in the bleed air duct up to a collecting volume (also referred to as a plenum) of a secondary air system can be increased. In marginal cases, this, in turn, allows the shifting of the extraction position upstream by one compressor stage. For the same static pressure level as that without the invention, there is then therefore a lower total temperature in the collecting volume. Colder air is therefore used to cool the turbine. This advantage of the improved cooling efficiency can either be used to increase the service life or, by throttling the cooling air mass flow, can contribute to reducing the specific fuel consumption.

On the other hand, the losses and blockages in the system can be reduced by aligning the guide means with the inflow angle from the flow path of the compressor, and an increased static pressure in the collecting volume can be maintained for various bleed air rates. At low bleed air rates, this improves the supply of bleed air to those client systems, the pressure requirements of which do not fall at relatively low speeds, in contrast to internal usage in the engine.

The terms "axially forward wall" and "axially rearward wall" relate to the axial direction of the compressor, which is defined by the machine axis thereof. Here, the axially forward wall is the upstream wall and the axially rearward wall the downstream wall in relation to the flow direction in the flow path.

As explained, the guide means are preferably provided and designed to guide a portion of the bleed air flow branched off from the flow path in the direction of the axially forward wall of the bleed air duct in such a way that a low-momentum zone which, without the invention, would be formed adjoining the inlet opening at the axially forward wall is reduced or dispersed by the branched-off bleed air flow.

Another embodiment of the invention envisages that the guide means guide a portion of the bleed air flow branched off from the flow path in the direction of the axially forward wall of the bleed air duct in such a way that a portion of the flow adjacent to the axially forward wall flows substantially parallel to said wall. Pressure losses due to a deflection of the bleed air flow at the duct wall are thereby avoided.

One design variant of the invention envisages that the stator comprises a guide vane and a radially outer vane platform connected to the guide vane, wherein the vane platform has at least one slot extending in the circumferential direction, the vane platform, by means of the at least one slot, forms at least one flow-guiding profile extending in the circumferential direction, and the flow-guiding profile is designed in such a way that a portion of the flow in the flow path is deflected by the profile in the direction of the axially forward wall.

According to this design variant, the guide means which guide a portion of the flow in the direction of the axially forward duct wall are integrated into the vane platform, which has at least one slot for this purpose. The slot simultaneously acts as a nozzle for the diverted air, which is guided into the dead zone at the axially forward duct wall. In this case, the flow can be taken along by means of the "Coanda effect" by the remaining bleed air that is being extracted in the region of the axially rearward duct wall from the flow path of the compressor. Eliminating or reducing the dead zone reduces the total pressure loss of the flow in the bleed air duct.

In this embodiment, the guide means integrated into the vane platform guide portions of the flow out of the flow path of the compressor even before the actual extraction point.

For this purpose, one embodiment envisages that the at least one slot extends in the vane platform at a distance from the axially rearward end thereof. Another embodiment envisages that the stator comprises a multiplicity of vane platforms, which adjoin one another in the circumferential direction and which each comprise at least one slot to form at least one profile. In this case, provision can be made for each vane platform to form a plurality of slots, which are arranged one behind the other in the circumferential direction, and associated profiles. It is also possible for a plurality of flow-guiding profiles spaced apart in the axial direction to be formed in the vane platform by means of a plurality of slots which are spaced apart in the axial direction.

As regards the term "flow-guiding profile" or "profile", it is observed that this term is used to denote the flow-guiding three-dimensional bodies overall. The term "profile" is thus not used in the restricted sense of a cross section of a body in the flow direction.

Another design variant of the invention provides a flow-guiding profile which extends over 360° in the circumferential direction and is arranged in the region of the inlet opening of the bleed air duct. In this case, the profile projects into the flow path. The profile deflects a portion of the flow in the flow path in the direction of the axially forward wall. One or more such 360° profiles may be provided.

According to this design variant, the flow-guiding profile extending over 360° which is provided performs a deflection according to the invention of the bleed air in the direction of the axially forward duct wall. In this case, the profile for extracting momentum projects slightly into the flow path of the compressor in order to be able to extract bleed air in an effective manner.

One embodiment thereof envisages that the 360° profile has a plurality of ribs, which are spaced apart in the circumferential direction and which each extend transversely in the bleed air duct and are used for securing the 360° profile in the bleed air duct. In this case, the ribs represent as it were a cascade insert. They hold the profile structurally. They extend from the axially forward wall to the axially rearward wall of the bleed air duct and, at the same time, are aligned in a tangential direction with respect to the flow in the bleed air duct. It is also possible to envisage that they themselves deflect the flow in the tangential direction. In this case, the ribs make an additional contribution to a static pressure increase in a downstream collecting volume by virtue of a swirl reduction in the mass flow of the bleed air flow.

Another embodiment envisages that the stator comprises vane platforms which are each connected to at least one guide vane and adjoin one another in the circumferential direction, wherein the 360° profile projects beyond the inner edge of the vane platform into the flow path counter to the radial direction.

The 360° profile can be formed integrally as a complete ring or, alternatively, can consist of bent component elements, which are connected to one another to form a complete ring.

Another design variant of the invention envisages that flow-guiding bodies in the form of ribs are formed on the axially rearward wall of the bleed air duct, said ribs being aligned in the longitudinal direction of the bleed air duct and deflecting the flow in the bleed air duct in the direction of the axially forward wall of the bleed air duct. According to this design variant, a redistribution of the flow to the axially forward wall is thus achieved by a flow deflection at the axially rearward wall.

One embodiment thereof envisages that the ribs extend from the axially rearward wall into the bleed air duct and, at the same time, are profiled in such a way that the flow in the bleed air duct undergoes a greater deflection adjacent to the axially rearward wall than at the tip of the ribs. In particular, provision can be made for the ribs to be profiled in such a way that the flow in the bleed air duct undergoes no deflection at the tip of the ribs. Thus, the shorter the distance from the axially rearward wall at which the bleed air flows, the more it is deflected toward the axially forward wall.

Another design variant of the invention envisages that flow-guiding bodies in the form of ribs are formed on the axially forward wall of the bleed air duct, said ribs being aligned in the longitudinal direction of the bleed air duct, extending from the axially forward wall into the bleed air duct and, at the same time, being profiled in such a way that the flow in the bleed air duct undergoes a deflection in the direction of the axially forward wall. One embodiment thereof envisages that the ribs are profiled in such a way that the flow in the bleed air duct undergoes a deflection toward the axially forward wall at the tip of the ribs, while there is no deflection of the flow adjacent to the axially forward wall.

According to this design variant, the structures which bring about a greater deflection of the bleed air in the direction of the axially forward wall are formed or arranged on the axially forward wall itself. In this case, bleed air is deflected in the direction of the axially forward wall by different profile shapes of the ribs on the axially forward wall and at the tip of the ribs.

One design variant of the invention envisages that the bleed air duct opens into a collecting volume (plenum) of a secondary air system which is fed with the bleed air. A plurality of bleed air extraction points, via each of which bleed air can be extracted, is formed in the collecting volume. In this case, it is envisaged that an annular structure, which contains openings through which the bleed air flow can pass through the annular structure, is formed upstream of the collecting volume in the bleed air duct, wherein the openings are designed as deflecting profiles. Such an embodiment is associated with the advantage that the bleed air can be fed to the collecting volume in an optimized manner, even under critical operating conditions. Here, the design of the openings as profiles minimizes pressure losses and makes it possible to introduce the bleed air into the collecting volume in a defined direction.

One embodiment thereof envisages that the openings are of different sizes or cross sections, wherein the openings are distributed over the circumference of the annular structure. Here, the distribution of the sizes is dependent on the distribution of the bleed air in the collecting volume or dependent on the position of the bleed air extraction points. In this case, the size of the openings makes it possible, depending on the circumferential position, to adapt the through flow area to static pressure sinks formed by the bleed air extraction points arranged in the collecting volume. This allows uniform mass flow extraction from the flow path of the compressor.

One embodiment envisages that the deflecting profiles are formed by webs (which may also be referred to as ribs or wall regions), which are formed in the circumferential direction between mutually adjoining openings and define said openings in the circumferential direction. The webs deflect the air which passes through the openings, thus enabling the air to be guided in a defined manner in the direction of certain bleed air extraction points.

Another embodiment envisages that the openings are aligned in the swirl direction of the bleed air flow at their axially forward side, i.e. are aligned in accordance with the flow direction of the bleed air in the bleed air duct. This alignment can differ depending on the circumferential position of the respective opening. During the deflection into the bleed air duct and possibly also due to structures in the bleed air duct, the bleed air has been subject to a swirl. By alignment of the openings in the annular structure with this swirl, pressure losses during the passage through the openings are minimized.

Another embodiment envisages that a plurality of adjacent openings in each case deflects the bleed air flow in such a way that it is guided to a certain adjacent bleed air extraction point. As a result, the bleed air can be guided selectively in the direction of certain pressure sinks which are associated with the bleed air extraction points in the collecting volume.

To achieve different sizes of the openings in the annular structure in the bleed air duct, one embodiment envisages that the inner radius of the lower edge of the openings is the same for all the openings, and the outer radius of the upper edge of the openings varies in accordance with the hole size. In this case, the openings are of rectangular design, for example.

In one embodiment, the annular structure is formed by a casing flange of a compressor casing. In this case, it is envisaged that the bleed air duct extends through the casing flange and is guided by the latter. One advantage associated therewith is that the casing flange is provided with an additional functionality, namely the selective influencing of the bleed air flow for optimization of the static internal pressure in the collecting volume. Moreover, such an embodiment makes it possible to align the bleed air duct with only a relatively small slope relative to the flow direction in the compressor since the bleed air duct does not have to be routed past the casing flange. As a result, only slight deflections of the bleed air in the radial direction are required, which reduces pressure losses during bleed air extraction.

Accordingly, one embodiment envisages that the bleed air duct extends at an angle of less than 90°, in particular at an angle of less than 60°, to the flow direction in the flow path.

However, attention is drawn to the fact that the annular structure formed in the bleed air duct can also be designed as a separate part and does not necessarily have to be embodied by a casing flange.

Another embodiment envisages that the bleed air duct is designed in such a way that the bleed air flow undergoes an acceleration in the region of the guide means which guide at least a portion of the bleed air flow branched off from the flow path in the direction of the axially forward wall of the bleed air duct. The flow is thus assisted in the deflecting part by a slight acceleration, while, in the subsequent section of the bleed air duct, which leads to the collecting volume, the bleed air duct is preferably designed as a diffuser, in which the flow is decelerated in a controlled manner and without excessive boundary layer loading in order to optimize the static pressure recovery in the collecting volume.

The bleed air duct is designed as an annular gap, for example, wherein the axially forward wall and the axially rearward wall of the bleed air duct are separated from one another by a gap. The annular gap can be of continuous design over 360° in the circumferential direction or, alternatively, can consist of a plurality of circular segments, each of which extends over a certain angular range in the circumferential direction.

The bleed air duct can branch off from the flow path of the axial compressor downstream of a rotor or stator.

According to another aspect of the invention, the invention relates to a gas turbine engine having a bleed air extraction device according to claim 1. In this case, the bleed air extraction device is implemented in a medium-pressure compressor or a high-pressure compressor of the gas turbine engine, for example.

It is pointed out that the present invention is described with reference to a cylindrical coordinate system which has the coordinates x, r, and $\varphi$. Herein x indicates the axial direction, r indicates the radial direction, and $\varphi$ indicates the angle in the circumferential direction. The axial direction herein is defined by the machine axis of the gas turbine engine in which the present invention is implemented, wherein the axial direction is that from the engine inlet in the direction of the engine outlet. This axial direction is identical with the axial direction of the axial compressor of the bleed air extraction device. Proceeding from the x-axis, the radial direction points radially outward. Terms such as "in front of", "behind", "front", and "rear" refer to the axial direction, or the flow direction in the engine. Terms such as "outer" or "inner" relate to the radial direction.

As noted elsewhere herein, the present disclosure may relate to a gas turbine engine. Such a gas turbine engine may comprise an engine core which comprises a turbine, a combustion chamber, a compressor, and a core shaft that connects the turbine to the compressor. Such a gas turbine engine may comprise a fan (having fan blades) which is positioned upstream of the engine core.

Arrangements of the present disclosure can be particularly, although not exclusively, beneficial for fans that are driven via a gear box. Accordingly, the gas turbine engine may comprise a gear box that receives an input from the core shaft and outputs drive for the fan so as to drive the fan at a lower rotational speed than the core shaft. The input to the gear box may be performed directly from the core shaft or indirectly from the core shaft, for example via a spur shaft and/or a spur gear. The core shaft may be rigidly connected to the turbine and the compressor, such that the turbine and the compressor rotate at the same rotational speed (wherein the fan rotates at a lower rotational speed).

The gas turbine engine as described and/or claimed herein may have any suitable general architecture. For example, the gas turbine engine may have any desired number of shafts, for example one, two or three shafts, that connect turbines and compressors. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft which connects the second turbine to the second compressor. The second turbine, second compressor and second core shaft may be arranged so as to rotate at a higher rotational speed than the first core shaft.

In such an arrangement, the second compressor may be positioned so as to be axially downstream of the first compressor. The second compressor may be arranged so as to receive (for example directly receive, for example via a generally annular duct) flow from the first compressor.

The gear box may be arranged so as to be driven by that core shaft (for example the first core shaft in the example above) which is configured to rotate (for example during use) at the lowest rotational speed. For example, the gear box may be arranged so as to be driven only by that core shaft (for example only by the first core shaft, and not the second core shaft, in the example above) which is configured to rotate (for example during use) at the lowest rotational speed. Alternatively thereto, the gear box may be arranged so as to be driven by one or a plurality of shafts, for example the first and/or the second shaft in the example above.

In the case of a gas turbine engine as described and/or claimed herein, a combustion chamber may be provided axially downstream of the fan and of the compressor(s). For example, the combustion chamber can lie directly downstream of the second compressor (for example at the exit of the latter), if a second compressor is provided. By way of further example, the flow at the exit of the compressor may be supplied to the inlet of the second turbine, if a second turbine is provided. The combustion chamber may be provided upstream of the turbine(s).

The or each compressor (for example the first compressor and the second compressor as described above) may comprise any number of stages, for example multiple stages. Each stage may comprise a row of rotor blades and a row of stator vanes, which may be variable stator vanes (in the sense that the angle of incidence of said variable stator vanes may be variable). The row of rotor blades and the row of stator vanes may be axially offset from one another.

The or each turbine (for example the first turbine and the second turbine as described above) may comprise any number of stages, for example multiple stages. Each stage may comprise a row of rotor blades and a row of stator vanes. The row of rotor blades and the row of stator vanes may be axially offset from one another.

Each fan blade may be defined as having a radial span width extending from a root (or a hub) at a radially inner location flowed over by gas, or at a 0% span width position, to a tip at a 100% span width position. The ratio of the radius of the fan blade at the hub to the radius of the fan blade at the tip may be less than (or of the order of): 0.4, 0.39, 0.38, 0.37, 0.36, 0.35, 0.34, 0.33, 0.32, 0.31, 0.3, 0.29, 0.28, 0.27, 0.26 or 0.25. The ratio of the radius of the fan blade at the hub to the radius of the fan blade at the tip may be in an inclusive range delimited by two of the values in the previous sentence (that is to say that the values may form upper or lower limits). These ratios may be referred to in general as the hub-to-tip ratio. The radius at the hub and the radius at the tip can both be measured at the leading periphery (or the axially frontmost periphery) of the blade. The hub-to-tip ratio refers, of course, to that portion of the fan blade which is flowed over by gas, that is to say the portion that is situated radially outside any platform.

The radius of the fan can be measured between the engine centerline and the tip of the fan blade at the leading periphery of the latter. The diameter of the fan (which can simply be double the radius of the fan) may be larger than (or of the order of): 250 cm (approximately 100 inches), 260 cm, 270 cm (approximately 105 inches), 280 cm (approximately 110 inches), 290 cm (approximately 115 inches), 300 cm (approximately 120 inches), 310 cm, 320 cm (approximately 125 inches), 330 cm (approximately 130 inches), 340 cm (approximately 135 inches), 350 cm, 360 cm (approximately 140 inches), 370 cm (approximately 145 inches), 380 cm (approximately 150 inches), or 390 cm (approximately 155 inches). The fan diameter may be in an inclusive range delimited by two of the values in the previous sentence (that is to say that the values may form upper or lower limits).

The rotational speed of the fan may vary during use. Generally, the rotational speed is lower for fans with a comparatively large diameter. Purely by way of non-limiting example, the rotational speed of the fan under cruise conditions may be less than 2500 rpm, for example less than 2300 rpm. Purely by way of a further non-limiting example, the rotational speed of the fan under cruise conditions for an engine having a fan diameter in the range from 250 cm to 300 cm (for example 250 cm to 280 cm) may also be in the range from 1700 rpm to 2500 rpm, for example in the range from 1800 rpm to 2300 rpm, for example in the range from 1900 rpm to 2100 rpm. Purely by way of a further non-limiting example, the rotational speed of the fan under cruise conditions for an engine having a fan diameter in the range from 320 cm to 380 cm may be in the range from 1200 rpm to 2000 rpm, for example in the range from 1300 rpm to 1800 rpm, for example in the range from 1400 rpm to 1600 rpm.

During use of the gas turbine engine, the fan (with associated fan blades) rotates about an axis of rotation. This rotation results in the tip of the fan blade moving with a speed $U_{tip}$. The work done by the fan blades on the flow results in an enthalpy rise dH in the flow. A fan tip loading can be defined as $dH/U_{tip}^2$, where dH is the enthalpy rise (for example the 1-D average enthalpy rise) across the fan and $U_{tip}$ is the (translational) speed of the fan tip, for example at the leading periphery of the tip (which can be defined as the fan tip radius at the leading periphery multiplied by the angular speed). The fan tip loading at cruise conditions may be more than (or of the order of): 0.3, 0.31, 0.32, 0.33, 0.34, 0.35, 0.36, 0.37, 0.38, 0.39, or 0.4 (wherein all units in this passage are $Jkg^{-1}K^{-1}/(ms^{-1})^2$). The fan tip loading may be in an inclusive range delimited by two of the values in the previous sentence (that is to say that the values may form upper or lower limits).

Gas turbine engines in accordance with the present disclosure can have any desired bypass ratio, where the bypass ratio is defined as the ratio of the mass flow rate of the flow through the bypass duct to the mass flow rate of the flow through the core at cruise conditions. In the case of some arrangements, the bypass ratio can be more than (or of the order of): 10, 10.5, 11, 11.5, 12, 12.5, 13, 13.5, 14, 14.5, 15, 15.5, 16, 16.5, or 17. The bypass ratio may be in an inclusive range delimited by two of the values in the previous sentence (that is to say that the values may form upper or lower limits). The bypass duct may be substantially annular. The bypass duct may be situated radially outside the engine core. The radially outer surface of the bypass duct may be defined by an engine nacelle and/or a fan casing.

The overall pressure ratio of a gas turbine engine as described and/or claimed herein can be defined as the ratio of the stagnation pressure upstream of the fan to the stagnation pressure at the exit of the highest pressure compressor (before entry into the combustion chamber). As a non-limiting example, the overall pressure ratio of a gas turbine engine as described and/or claimed herein at cruising speed may be greater than (or of the order of): 35, 40, 45, 50, 55, 60, 65, 70, 75. The overall pressure ratio may be in an inclusive range delimited by two of the values in the previous sentence (that is to say that the values may form upper or lower limits).

The specific thrust of an engine can be defined as the net thrust of the engine divided by the total mass flow through the engine. The specific thrust of an engine as described and/or claimed herein at cruise conditions may be less than (or of the order of): 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range delimited by two of the values in the previous sentence (that is to say that the values may form upper or lower limits). Such engines can be particularly efficient in comparison with conventional gas turbine engines.

A gas turbine engine as described and/or claimed herein may have any desired maximum thrust. Purely by way of a non-limiting example, a gas turbine as described and/or claimed herein may be capable of generating a maximum thrust of at least (or of the order of): 160 kN, 170 kN, 180 kN, 190 kN, 200 kN, 250 kN, 300 kN, 350 kN, 400 kN, 450 kN, 500 kN, or 550 kN. The maximum thrust may be in an inclusive range delimited by two of the values in the previous sentence (that is to say that the values may form upper or lower limits). The thrust referred to above may be the maximum net thrust at standard atmospheric conditions at sea level plus 15 degrees C. (ambient pressure 101.3 kPa, temperature 30 degrees C.) in the case of a static engine.

In use, the temperature of the flow at the entry to the high-pressure turbine can be particularly high. This temperature, which can be referred to as TET, may be measured at the exit to the combustion chamber, for example directly upstream of the first turbine blade, which in turn can be referred to as a nozzle guide blade. At cruising speed, the TET may be at least (or of the order of): 1400 K, 1450 K, 1500 K, 1550 K, 1600 K, or 1650 K. The TET at constant speed may be in an inclusive range delimited by two of the values in the previous sentence (that is to say that the values may form upper or lower limits). The maximum TET in the use of the engine may be at least (or of the order of), for example: 1700 K, 1750 K, 1800 K, 1850 K, 1900 K, 1950 K, or 2000 K. The maximum TET may be in an inclusive range delimited by two of the values in the previous sentence (that is to say that the values may form upper or lower limits). The maximum TET may occur, for example, under a high thrust condition, for example under a maximum take-off thrust (MTO) condition.

A fan blade and/or an airfoil portion of a fan blade described and/or claimed herein may be manufactured from any suitable material or a combination of materials. For example, at least a part of the fan blade and/or of the airfoil can be manufactured at least in part from a composite, for example a metal matrix composite and/or an organic matrix composite, such as carbon fiber. By way of further example, at least a part of the fan blade and/or of the airfoil can be manufactured at least in part from a metal, such as a titanium-based metal or an aluminum-based material (such as an aluminum-lithium alloy) or a steel-based material. The fan blade may comprise at least two regions which are manufactured using different materials. For example, the fan blade may have a protective leading periphery, which is manufactured using a material that is better able to resist impact (for example of birds, ice, or other material) than the rest of the blade. Such a leading periphery may, for example, be manufactured using titanium or a titanium-based alloy. Thus, purely by way of example, the fan blade may have a carbon-fiber-based or aluminum-based body (such as an aluminum-lithium alloy) with a titanium leading periphery.

A fan as described and/or claimed herein may comprise a central portion, from which the fan blades may extend, for example in a radial direction. The fan blades may be attached to the central portion in any desired manner. For example, each fan blade may comprise a fixing device which can engage with a corresponding slot in the hub (or disk). Purely by way of example, such a fixing device may be in the form of a dovetail that can be inserted into and/or engage with a corresponding slot in the hub/disk in order for the fan blade to be fixed to the hub/disk. By way of further example, the fan blades can be formed integrally with a central portion. Such an arrangement may be referred to as a blisk or a bling. Any suitable method may be used to manufacture such a blisk or such a bling. For example, at least a part of the fan blades can be machined from a block and/or at least a part of the fan blades can be attached to the hub/disk by welding, such as linear friction welding, for example.

The gas turbine engines described and/or claimed herein may or may not be provided with a variable area nozzle (VAN). Such a variable area nozzle can allow the exit cross section of the bypass duct to be varied during use. The general principles of the present disclosure can apply to engines with or without a VAN.

The fan of a gas turbine as described and/or claimed herein may have any desired number of fan blades, for example 16, 18, 20 or 22 fan blades.

As used herein, cruise conditions can mean cruise conditions of an aircraft to which the gas turbine engine is attached. Such cruise conditions can be conventionally defined as the conditions at mid-cruise, for example the conditions experienced by the aircraft and/or the engine between (in terms of time and/or distance) the top of climb and the start of descent.

Purely by way of example, the forward speed at the cruise condition can be any point in the range of from Mach 0.7 to 0.9, for example 0.75 to 0.85, for example 0.76 to 0.84, for example 0.77 to 0.83, for example 0.78 to 0.82, for example 0.79 to 0.81, for example in the magnitude of Mach 0.8, in the magnitude of Mach 0.85 or in the range of from 0.8 to 0.85. Any arbitrary speed within these ranges can be the constant cruise condition. In the case of some aircraft, the constant cruise conditions may be outside these ranges, for example below Mach 0.7 or above Mach 0.9.

Purely by way of example, the cruise conditions may correspond to standard atmospheric conditions at an altitude that is in the range from 10,000 m to 15,000 m, for example in the range from 10,000 m to 12,000 m, for example in the range from 10,400 m to 11,600 m (around 38,000 ft), for example in the range from 10,500 m to 11,500 m, for example in the range from 10,600 m to 11,400 m, for example in the range from 10,700 m (around 35,000 ft) to 11,300 m, for example in the range from 10,800 m to 11,200 m, for example in the range from 10,900 m to 11,100 m, for example of the order of 11,000 m. The cruise conditions may correspond to standard atmospheric conditions at any given altitude in these ranges.

Purely by way of example, the cruise conditions may correspond to the following: a forward Mach number of 0.8; a pressure of 23,000 Pa; and a temperature of −55 degrees C.

As used anywhere herein, "cruising speed" or "cruise conditions" may mean the aerodynamic design point. Such an aerodynamic design point (or ADP) may correspond to the conditions (including, for example, the Mach number, environmental conditions, and thrust requirement) for which the fan operation is designed. This may mean, for example, the conditions under which the fan (or the gas turbine engine) has the optimum efficiency in terms of construction.

In use, a gas turbine engine described and/or claimed herein can operate at the cruise conditions defined elsewhere herein. Such cruise conditions can be determined by the cruise conditions (for example the mid-cruise conditions) of an aircraft to which at least one (for example 2 or 4) gas turbine engine can be fastened in order to provide the thrust force.

It is self-evident to a person skilled in the art that a feature or parameter described above in relation to one of the above aspects can be applied to any other aspect, unless these are mutually exclusive. Furthermore, any feature or any parameter described here may be applied to any aspect and/or combined with any other feature or parameter described here, unless these are mutually exclusive.

The invention will be explained in more detail below on the basis of a plurality of exemplary embodiments with reference to the figures of the drawing. In the drawing.

Figure 1:
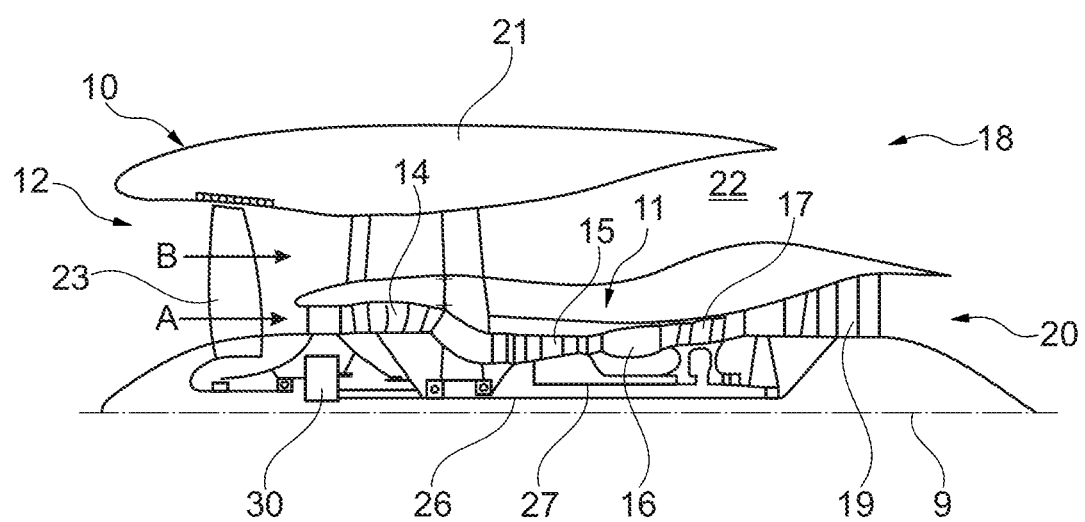
FIG. 1 shows a lateral sectional view of a gas turbine engine.

FIG. 1 illustrates a gas turbine engine 10 having a principal rotational axis 9. The engine 10 comprises an air intake 12 and a thrust fan 23 that generates two air flows: a core air flow A and a bypass air flow B. The gas turbine engine 10 comprises a core 11 which receives the core air flow A. In the sequence of axial flow, the engine core 11 comprises a low-pressure compressor 14, a high-pressure compressor 15, a combustion device 16, a high-pressure turbine 17, a low-pressure turbine 19, and a core thrust nozzle 20. An engine nacelle 21 surrounds the gas turbine engine 10 and defines a bypass duct 22 and a bypass thrust nozzle 18. The bypass airflow B flows through the bypass duct 22. The fan 23 is attached to and driven by the low pressure turbine 19 by way of a shaft 26 and an epicyclic gear box 30.

During use, the core airflow A is accelerated and compressed by the low-pressure compressor 14 and directed into the high-pressure compressor 15, where further compression takes place. The compressed air expelled from the high-pressure compressor 15 is directed into the combustion device 16, where it is mixed with fuel and the mixture is combusted. The resulting hot combustion products then propagate through the high-pressure and the low-pressure turbines 17, 19 and thereby drive said turbines, before they are expelled through the nozzle 20 to provide a certain thrust. The high-pressure turbine 17 drives the high-pressure compressor 15 by means of a suitable connecting shaft 27. The fan 23 generally provides the major part of the thrust force. The epicyclic gear box 30 is a reduction gear box.

It is noted that the terms "low-pressure turbine" and "low-pressure compressor" as used herein can be taken to mean the lowest pressure turbine stage and the lowest pressure compressor stage (that is to say not including the fan 23) respectively and/or the turbine and compressor stages that are connected to one another by the connecting shaft 26 with the lowest rotational speed in the engine (that is to say not including the gear box output shaft that drives the fan 23). In some documents, the "low-pressure turbine" and the "low-pressure compressor" referred to herein may alternatively be known as the "intermediate-pressure turbine" and "intermediate-pressure compressor". Where such alternative nomenclature is used, the fan 23 can be referred to as a first compression stage or lowest-pressure compression stage.

Other gas turbine engines in which the present disclosure can be used may have alternative configurations. For example, such engines may have an alternative number of compressors and/or turbines and/or an alternative number of connecting shafts. By way of a further example, the gas turbine engine shown in FIG. 1 has a split flow nozzle 20, 22, meaning that the flow through the bypass duct 22 has its own nozzle that is separate from and radially outside the core engine nozzle 20. However, this is not restrictive, and any aspect of the present disclosure can also apply to engines in which the flow through the bypass duct 22 and the flow through the core 11 are mixed or combined before (or upstream of) a single nozzle, which may be referred to as a mixed flow nozzle. One or both nozzles (whether mixed or split flow) can have a fixed or variable area. Although the example described relates to a turbofan engine, the disclosure can be applied, for example, to any type of gas turbine engine, such as, for example, an open rotor engine (in which the fan stage is not surrounded by an engine nacelle) or a turboprop engine. In some arrangements, the gas turbine engine 10 may not comprise a gear mechanism 30.

The geometry of the gas turbine engine 10, and components thereof, is/are defined by a conventional axis system, comprising an axial direction (which is aligned with the rotation axis 9), a radial direction (in the bottom-to-top direction in FIG. 1), and a circumferential direction (perpendicular to the view in FIG. 1). The axial, radial and circumferential directions run so as to be mutually perpendicular.

In the context of the present invention, it is bleed air extraction via a bleed air duct which is of significance. Bleed air extraction takes place, for example, downstream of a stator of the low-pressure compressor or of the high-pressure compressor in FIG. 1.

Figure 2:
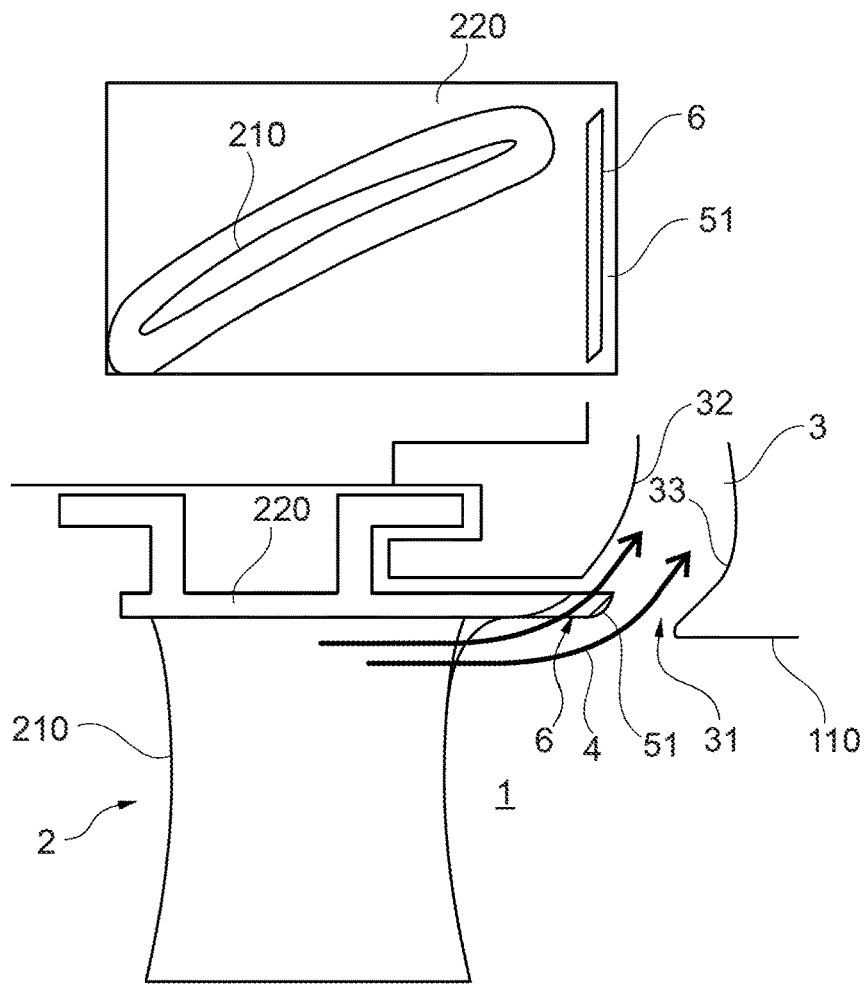
FIG. 2 shows, in plan view and in side view, an exemplary embodiment of a bleed air extraction device, in which a flow-guiding profile, which guides a portion of the bleed air flow branched off from the flow path in the direction of the axially forward wall of the bleed air duct, is formed in a vane platform.

In the upper part of the figure in a view from above and, in the lower part of the figure, in a side view, FIG. 2 shows a bleed air extraction device, which comprises an axial compressor, which is formed in a flow path 1 and comprises at least one compressor stage having a rotor and a stator, wherein a stator 2 of a compressor stage is illustrated. The flow path 1 is bounded radially on the outside by a radially outer flow path boundary 110. It is bounded radially on the inside by a radially inner flow path boundary (cf. flow path boundary 120 in FIG. 14).

The bleed air extraction device furthermore comprises a bleed air duct 3, via which a bleed air flow 4 is branched off from the flow path 1. The bleed air duct 3 comprises an inlet opening 31, which is formed downstream of the stator 2 in the radially outer flow path boundary 110. Moreover, the bleed air duct 3 comprises an axially forward wall 32 and an axially rearward wall 33, which adjoin the inlet opening 31. The bleed air duct 3 is of annular design and extends over an angular range of 360° in the circumferential direction. As an alternative, provision can be made for the bleed air duct 3 to be formed only in certain circumferential regions of the bleed air extraction device.

The stator 2 comprises a guide vane 210 and a radially outer vane platform 220, on which the guide vane 210 is secured. The stator 2 can furthermore have a radially inner vane platform (not illustrated). A slot 6 extending in the circumferential direction is formed in the vane platform 220. That region of the vane platform 220 which extends between the slot 6 and the downstream end of the vane platform 220 is designed as a flow-guiding profile 51, which likewise extends in the circumferential direction.

As illustrated in FIG. 2, this leads to a portion of the bleed air flow 4 branched off from the flow path 1 flowing through the slot 6 and, in the process, being deflected by the flow-guiding profile 51 in the direction of the axially forward wall 32 of the bleed air duct 3.

Figure 3:
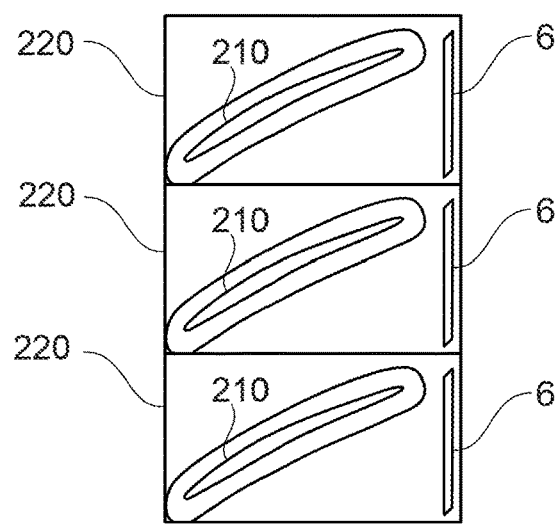
FIG. 3 shows a plan view of a plurality of vane platforms corresponding to FIG. 2 arranged adjacent to one another in the circumferential direction.

FIG. 3 illustrates that, in the circumferential direction, a plurality of vane platforms 220 with guide vanes 210 is formed adjacent to one another in the circumferential direction, wherein a flow-guiding profile 51 according to FIG. 2 is in each case formed by the slot 6. Bleed air flow 4 is thus guided in the direction of the axially forward wall 32 by slots 6 and profiles 51 over the entire circumference of the bleed air duct 3.

In this case, provision can be made for the bleed air flow 4 to be guided onto the axially forward wall 32 by the profile 51 in such a way that it is substantially parallel to the axially forward wall 32 adjacent to the latter. Flow losses due to deflection at the wall 32 are thereby avoided.

Figure 4:
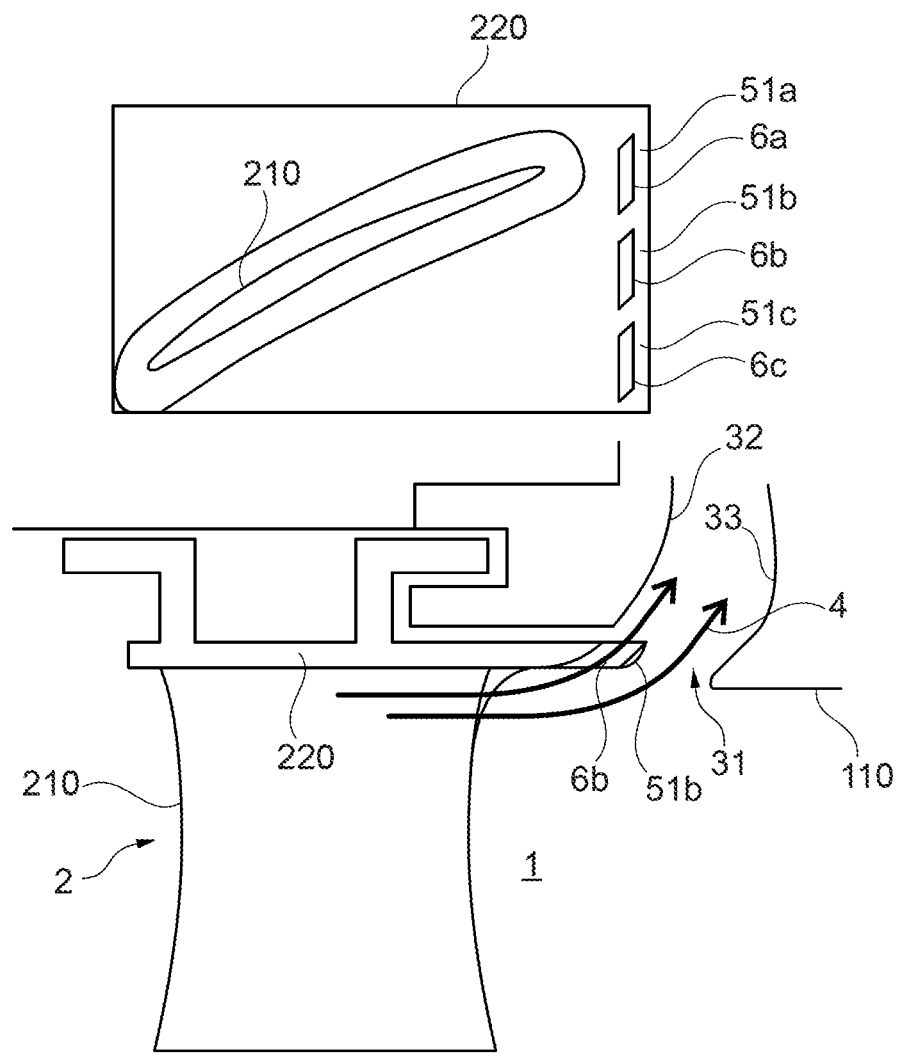
FIG. 4 shows a variation of the exemplary embodiment in FIG. 2, wherein a plurality of flow-guiding profiles is formed one behind the other in the circumferential direction in a vane platform.

FIG. 4 shows a modification of the bleed air extraction device in FIG. 2. The modification consists in that, instead of a slot 6 extending in the vane platform 220, as provided in FIG. 2, a plurality of shorter slots 6a, 6b, 6c is provided, which each form correspondingly shorter flow-guiding profiles 51a, 51b, 51c. This illustrates that numerous variations are possible in the number and positioning of the slots and profiles.

In the case of the exemplary embodiments in FIGS. 2 to 4, the bleed air is guided by means of the slots 6, 6a, 6b, 6c and the profiles 51, 51a, 51b, 51c into low-momentum zones at the axially forward wall 32, with the result that backflow regions at the forward wall 32, which may occur especially in the case of low bleed air rates, are reduced or completely eliminated. This leads to a reduction in the total pressure loss of the flow guidance and maximization of the static pressure recovery.

Figure 5:
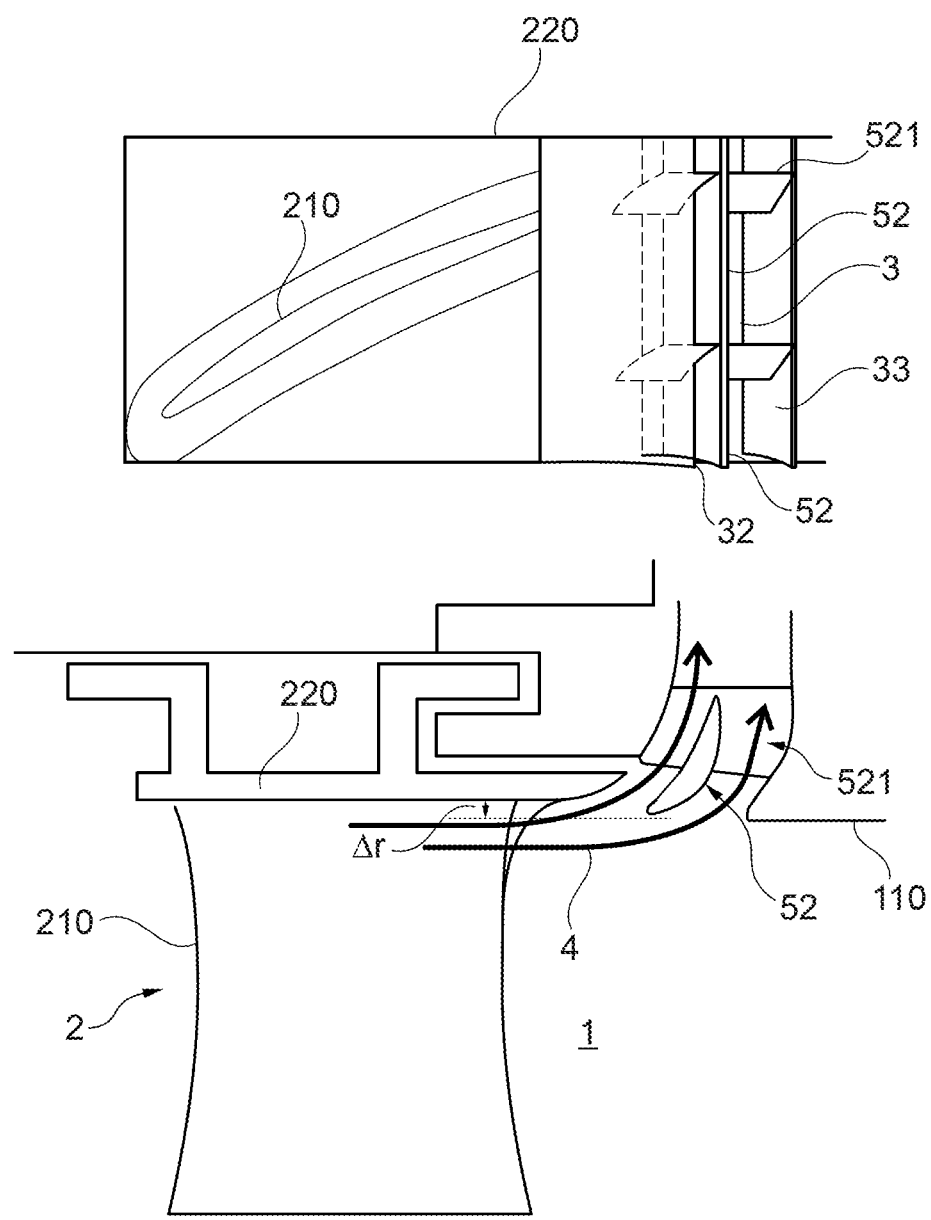
FIG. 5 shows, in plan view and in side view, an exemplary embodiment of a bleed air extraction device, in which a flow-guiding profile, which guides a portion of the bleed air flow branched off from the flow path in the direction of the axially forward wall of a bleed air duct, is formed by a ring extending over 360° in the circumferential direction.

FIG. 5 shows, in side view from above and in a side view, a further exemplary embodiment of a bleed air extraction device. Unlike the exemplary embodiment in FIGS. 2 to 4, no flow-guiding profile is formed in the vane platform 220 of the stator 2. Instead, an annular flow-guiding profile 52, which extends over 360° in the circumferential direction and is arranged in the region of the inlet opening of the bleed air duct 3, is provided.

At its radially inner edge, the 360° profile 52 projects over a radial region Δr relative to the inside of the vane platform 220. This ensures that the profile 52 can effectively deflect air from the flow of the flow path 1 into the bleed air duct 3. In this case, the required gas path area which is required to extract the minimum bleed air mass flow is not exceeded.

To secure the profile 52 in the bleed air duct 3, the profile 52 has a plurality of ribs 521 spaced apart in the circumferential direction, which each extend transversely in the bleed air duct 3. The ribs 521, which hold the profile 52 structurally, are oriented in a tangential direction relative to the flow and, for their part, likewise deflect the flow in a tangential direction. Through swirl reduction in the extraction mass flow they make an additional contribution to the static pressure increase in a downstream collecting volume, which is explained in greater detail with reference to FIG. 14.

In variant embodiments, the ribs 521 are connected only to the axially forward wall 32, only to the axially rearward wall 33 or to both walls 32, 33.

Figure 6:
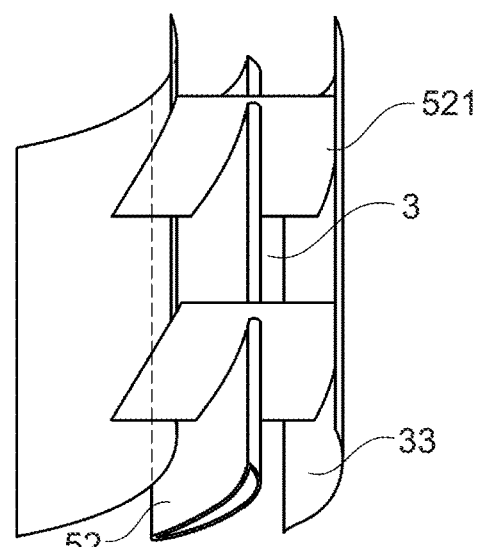
FIG. 6 shows the arrangement according to FIG. 5 in a view from above.
Figure 7:
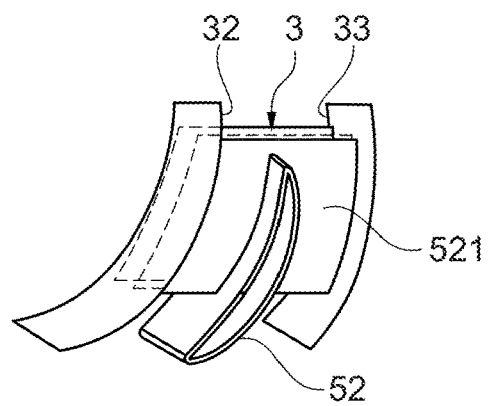
FIG. 7 shows the arrangement according to FIG. 5 in a side view.
Figure 8:
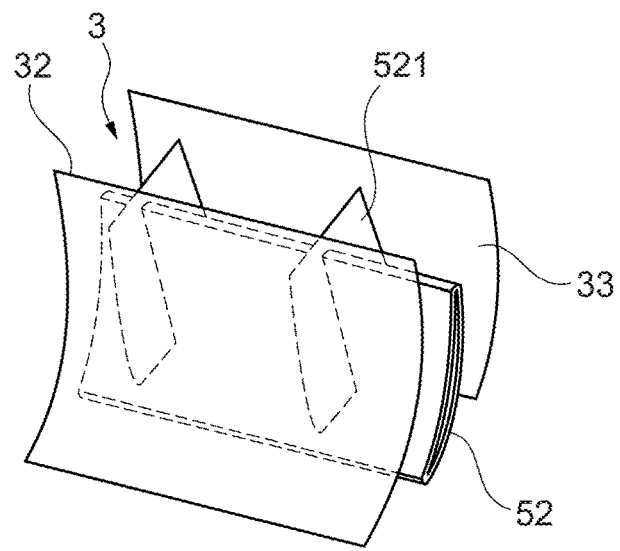
FIG. 8 shows the arrangement according to FIG. 5 in a view from the front.

FIGS. 6 to 8 show, in a view from above, in a side view and in a view from the front, a section of the bleed air duct 3 with the axially forward wall 32, the axially rearward wall 33, the flow-guiding profile 52 and the ribs 521 of the flow-guiding profile.

In the exemplary embodiment in FIGS. 5 to 8 too, the momentum extracted is deflected into the dead zone, formed at the axially forward wall 32, of the bleed air extraction system, and ensures adequate flow through this zone, even at low mass flows. The total pressure loss is thereby reduced and the static pressure recovery is maximized.

Figure 9:
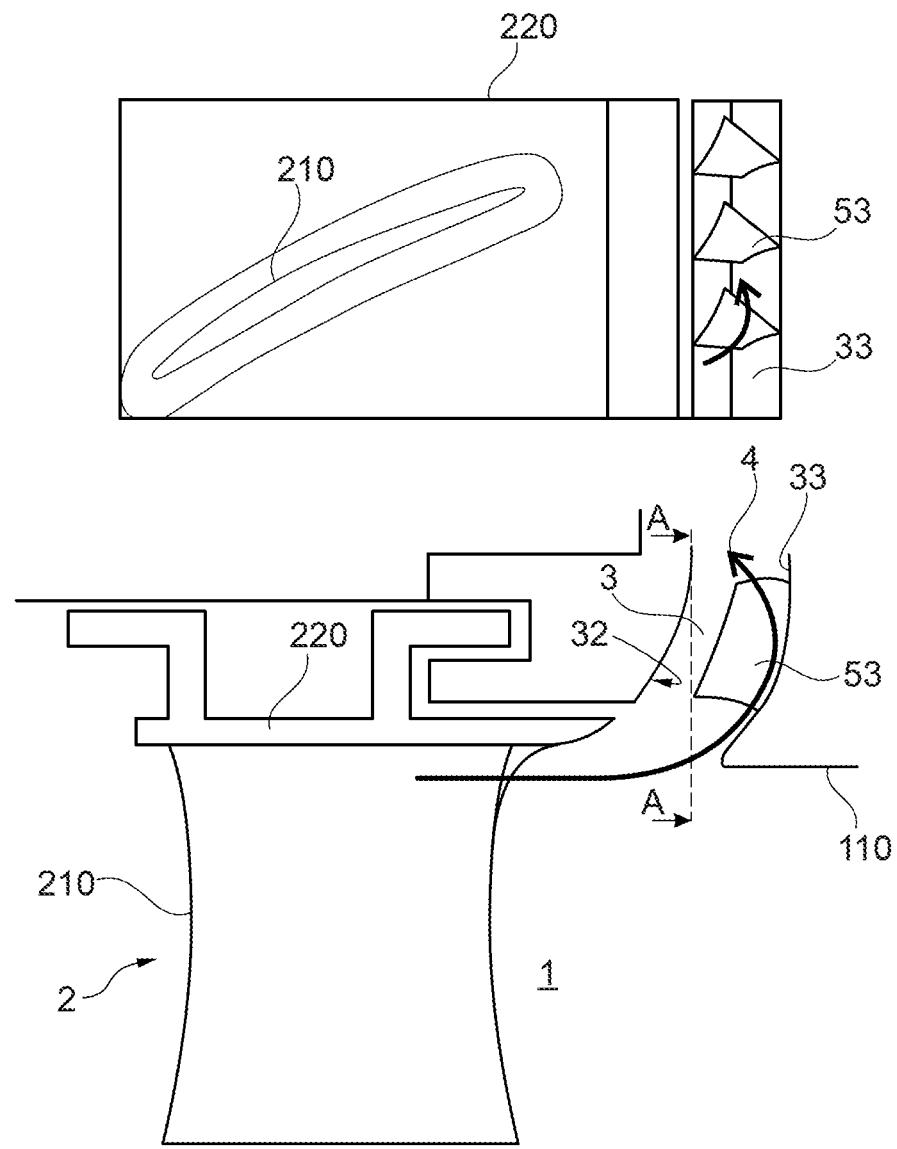
FIG. 9 shows, in plan view and in side view, an exemplary embodiment of a bleed air extraction device, in which a flow-guiding profile, which guides a portion of the bleed air flow branched off from the flow path in the direction of the axially forward wall of a bleed air duct, is formed by ribs arranged on the axially rearward wall of the bleed air duct.
Figure 10:
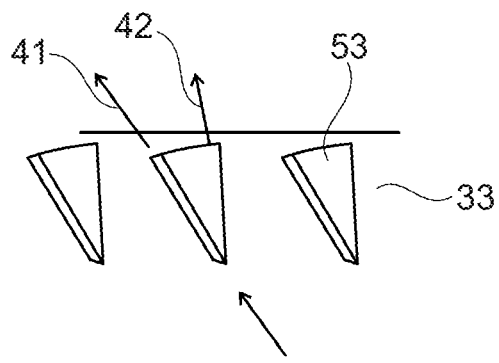
FIG. 10 shows a view along the line A-A in FIG. 9.

Another exemplary embodiment is illustrated in FIGS. 9 and 10. In this exemplary embodiment, the guide means which deflect the bleed air in the direction of the axially forward wall 32 are in the form of ribs 53, which are formed on the axially rearward wall 33 of the bleed air duct 3. In this case, the ribs 53 are aligned in the longitudinal direction of the bleed air duct 3. Starting from the axially rearward wall, they extend into the bleed air duct 3, wherein the tip of the ribs 53 is situated in the bleed air duct 3. They are profiled in such a way that the flow in the bleed air duct 3 adjacent to the axially rearward wall 33 undergoes a greater deflection than at the tip of the ribs 53. In particular, the bleed air flow at the tip of the ribs 33 no longer undergoes a deflection. This increases successively from the tip of the ribs 53 in the direction of the axially rearward wall 33. The flow 4 in the bleed air duct 3 is thereby deflected in the direction of the axially forward wall 32 of the bleed air duct 3.

In this case, FIG. 10 illustrates that the flow 42 which is adjacent to the axially rearward wall 33 undergoes a deflection, while the flow 41 which flows in the region of the tip of the ribs 53 projecting into the bleed air duct undergoes no deflection or a relatively slight deflection.

In the exemplary embodiment in FIGS. 9 and 10, the ribs 53 introduce into the bleed air duct 3 profiles which bring about redistribution of the flow toward the axially forward duct wall 32. The high-loss zone present at low bleed air rates at the axially forward wall 32 is supplied with momentum by the ribs 53, and the separated flow is reduced. The deflection of the flow into this zone is accomplished by profiling which generates a large deflection at the axially rearward wall 33 and thus delivers a higher static pressure at the outlet and does not generate a deflection at the rib edge facing the axially forward wall 32. At the non-deflecting part of the ribs 53, the static backpressure is lower and allows the "healthy" flow to divert in this direction toward the axially forward wall 32.

Figure 11:
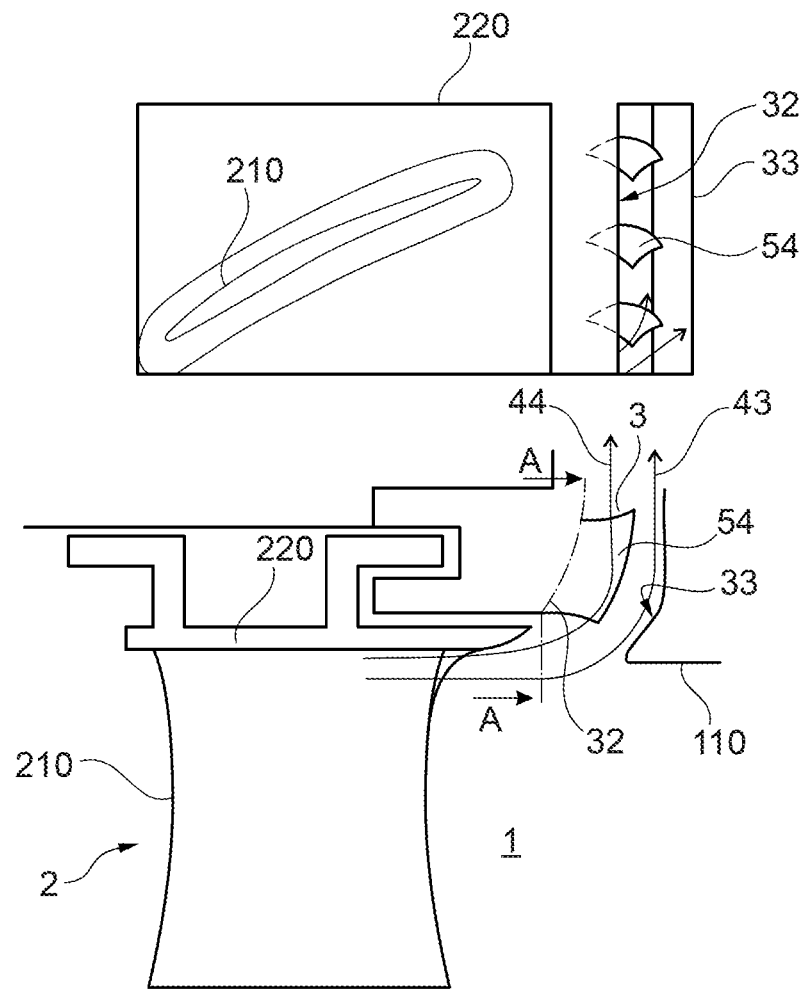
FIG. 11 shows, in plan view and in side view, an exemplary embodiment of a bleed air extraction device, in which a flow-guiding profile, which guides a portion of the bleed air flow branched off from the flow path in the direction of the axially forward wall of a bleed air duct, is formed by ribs arranged on the axially forward wall of the bleed air duct.
Figure 12:
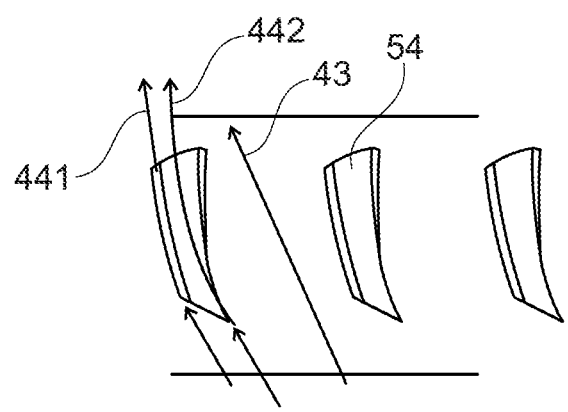
FIG. 12 shows a view along the line A-A in FIG. 11.

In the exemplary embodiment in FIGS. 11 and 12, the guide means which deflect the bleed air in the direction of the axially forward wall 32 are likewise in the form of ribs 54. Unlike in the exemplary embodiment in FIGS. 9 and 10, however, the ribs 54 in the exemplary embodiment in FIGS. 11 and 12 are formed on the axially forward wall 32 of the bleed air duct 3. In this case, they are aligned in the longitudinal direction of the bleed air duct 3. Starting from the axially forward wall 32, the ribs 54 extend into the bleed air duct 3, wherein the tip of the ribs 54 is situated in the bleed air duct 3. The part of the bleed air flow 44 which passes through the ribs 54 is deflected in the direction of the axially forward wall 32. The part of the bleed air flow 43 which flows between the ribs 54 and the axially rearward wall 33 is not influenced by the ribs 54.

As can be seen especially from FIG. 12, the ribs 54 are profiled in such a way that the flow 442 in the bleed air duct 3 undergoes a deflection toward the axially forward wall 32 at the tip of the ribs 54, while the flow 441 which flows adjacent to the axially forward wall 32 undergoes no deflection or a relatively slight deflection. The deflection in the direction of the axially forward wall 32 decreases from the tip of the ribs 53 in the direction of the axially forward wall 32.

In the exemplary embodiment in FIGS. 11 and 12, the ribs 54 thus provide profiles positioned on the axially forward wall 32 which bring about redistribution of the flow toward the axially forward duct wall 32. A circumferential movement of the flow separation at low bleed air rates is thereby prevented. At the same time, high-momentum flow toward the axially forward wall 32 is redistributed by the different profile shapes of the ribs 54 on the axially forward wall 32 and the rib tip. In this case, the main flow swirl is assumed at all levels at the inlet of the ribs 54. At the axially forward wall 32, the swirl is not reduced by the ribs 54. On other hand, there is a deflection at the rib outer edge. The profile shape of the ribs 54 thus has the effect of redistributing the momentum to the axially forward wall 32, leading to more uniform separation with lower backflow components.

In all the abovementioned exemplary embodiments, the structures 51-54 for deflecting the bleed air at the axially forward wall 32 can be followed by controlled diffusion by the contouring of the side walls of the bleed air duct 3 in order to avoid flow separations and to maximize a static pressure recovery into a collecting volume.

Figure 13:
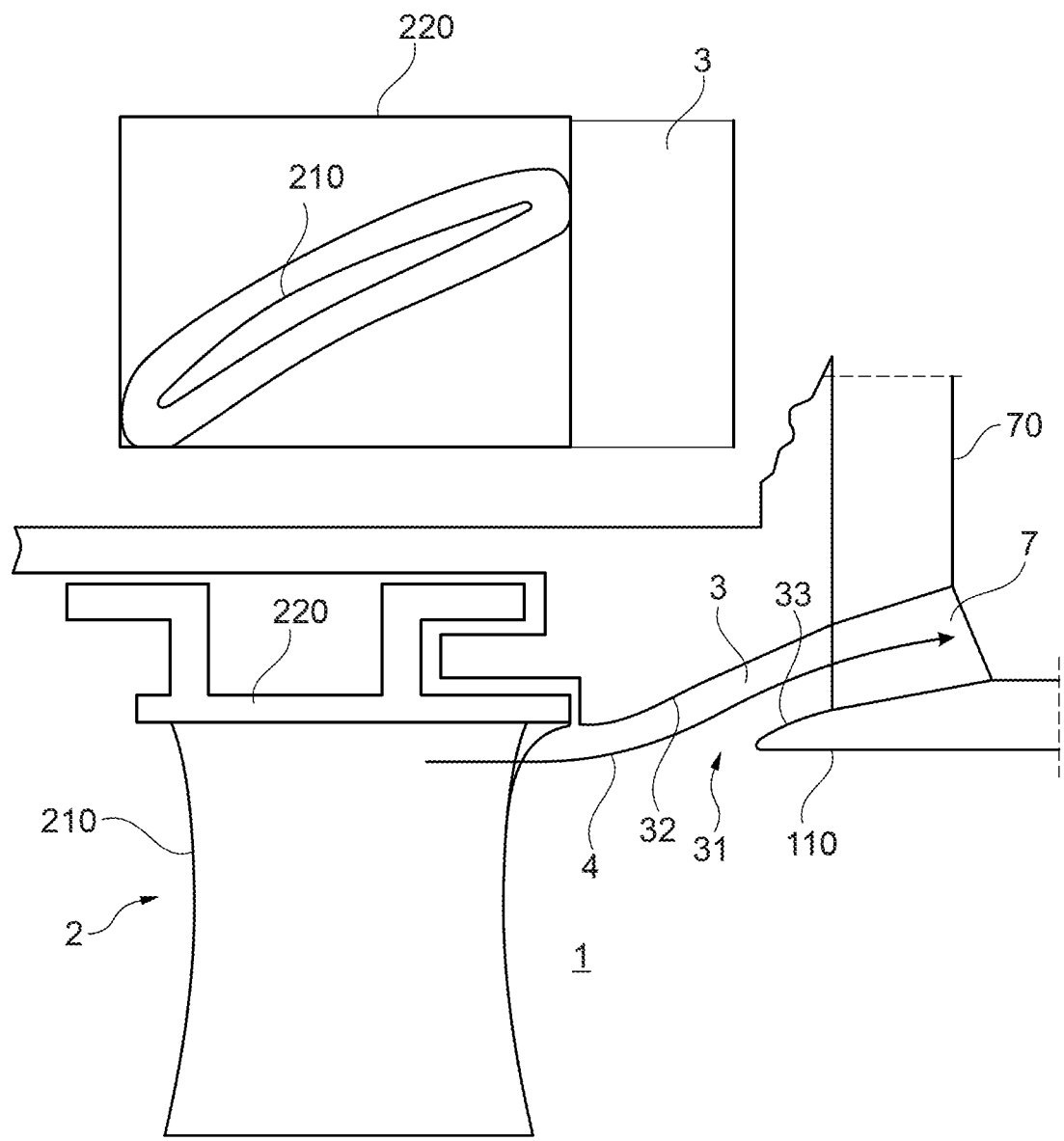
FIG. 13 shows, in plan view and in side view, an exemplary embodiment of a bleed air extraction device, in which the bleed air duct is passed through a casing flange, wherein the casing flange has a plurality of openings of different sizes arranged in a ring, through which the bleed air is guided into an adjoining collecting space.

FIG. 13 shows an exemplary embodiment in which the bleed air duct 3 is passed through an annular structure 7, which is provided in the exemplary embodiment illustrated by a region of a casing flange 70. Guide means 51-54 corresponding to FIGS. 2 to 11, which deflect a portion of the bleed air flow 4 in the direction of the axially forward wall 32, can be provided but are not separately illustrated. The fundamental construction of the bleed air extraction device corresponds to that in FIG. 2.

Figure 14:
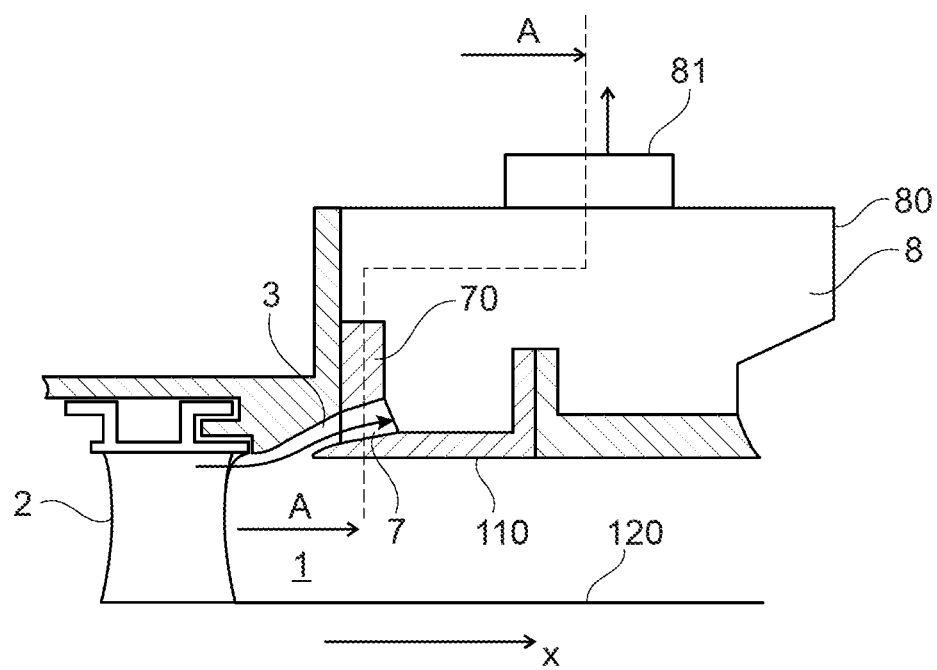
FIG. 14 shows an illustration of a bleed air extraction device which, in addition to the components in FIG. 13, also shows a collecting space, into which the bleed air is guided, and bleed air extraction points starting from the collecting space.

Here, FIG. 14 illustrates the overall arrangement. Thus, the bleed air duct 3 opens into a collecting volume 8, which is defined by a surrounding casing 80. The collecting volume 8 is part of a secondary air system for supplying various components of the gas turbine engine with bleed air. For this purpose, the collecting volume 8 has a plurality of bleed air extraction points 81. The volume flow of bleed air which is extracted can vary at the individual bleed air extraction points 81.

The bleed air enters the collecting volume 8 via the annular structure 7, which is formed upstream, directly ahead of the collecting volume 8. By virtue of the fact that the annular structure 7 is formed in the casing flange 70, the bleed air duct 3 can be oriented with a relatively small slope relative to the flow direction in the flow path 1 of the compressor. Thus, it is not necessary to route the bleed air duct 3 past the casing flange 70 that is inevitably present. The bleed air duct 3 extends at an angle of less than 90°, for example, in particular at an angle of less than 60°, to the flow direction in the flow path 1. By virtue of the slight slope of the bleed air duct 3, only slight deflections of the bleed air in the radial direction are required during the extraction of bleed air, and this reduces pressure losses during the extraction of bleed air, thus making it possible to achieve a higher static pressure in the collecting volume.

Figure 15:
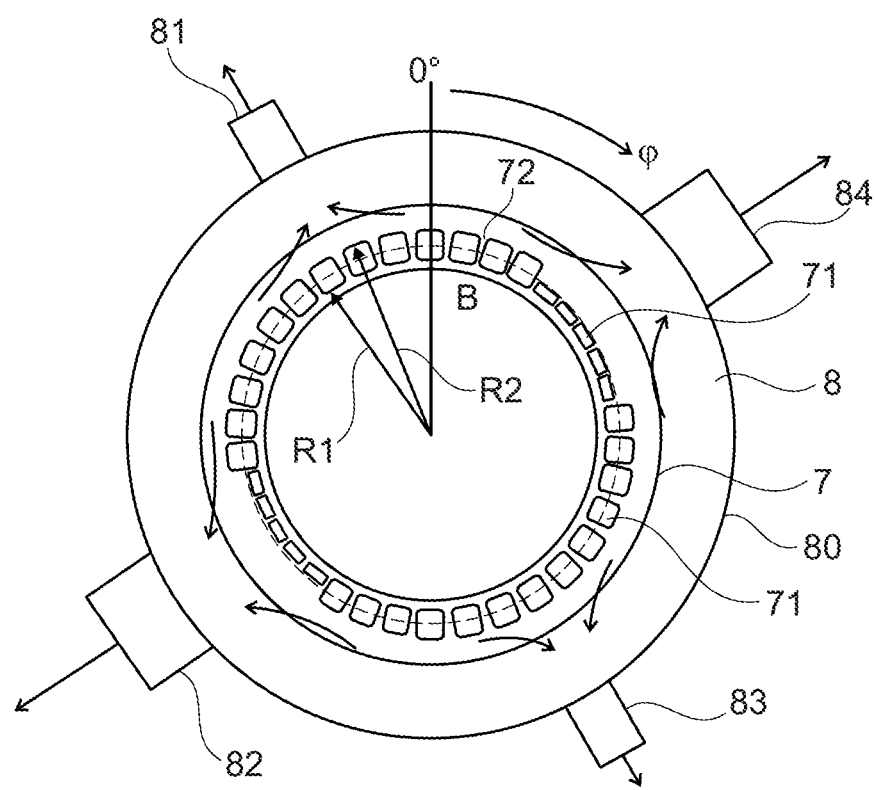
FIG. 15 shows a view along the line A-A in FIG. 14, illustrating the openings of different sizes arranged in a ring in the casing flange.

According to the sectional illustration in FIG. 15, which illustrates a section along the line A-A in FIG. 14, a multiplicity of openings 71 is formed in the annular structure 7, these being distributed over the circumference of the annular structure 7 and, at the same time, possibly being of different sizes, i.e. having different cross-sectional areas. In this case, the openings 71 are designed as deflecting profiles, as will be explained below.

In FIG. 15, it is possible to see a plurality of bleed air extraction points 81-84, which are formed on the collecting volume 8 in a manner spaced apart in the circumferential direction. The volume flow that can be extracted at the individual bleed air extraction points 81-84 can vary.

To achieve different sizes of the openings 71, it is envisaged that, although the inner radius R1 of the lower edge of the openings 71 is the same for all the openings 71, the outer radius R2 of the upper edge of the openings 71 varies in accordance with the hole size. In this case, the openings 71 are of substantially rectangular design.

The air in the bleed air duct 3 can pass through the annular structure 7 only through the openings 71 and therefore enters the collecting volume 8 only via said openings.

Webs or wall regions 72 which define the width of the openings are formed in the circumferential direction between the openings 71. As can be seen from the developed illustration in FIG. 16, the webs 72 are designed as deflecting profiles. By virtue of the shape of the webs 72, the openings 71 are designed as deflecting profiles. In this case, the webs 72 are shaped in such a way that adjacent groups of openings 71 guide the flow in the bleed air duct 3 to a particular one of the bleed air extraction points 81-84. In this case, the distribution of the sizes of the openings 71 is matched to the bleed air extraction points 81-84. As can also be seen from FIG. 15, the extraction openings 71 are of smaller design, for example, if the associated bleed air extraction points 82, 84 form a large pressure sink. The mass flow of the bleed air is thereby made more uniform overall.

Figure 16:
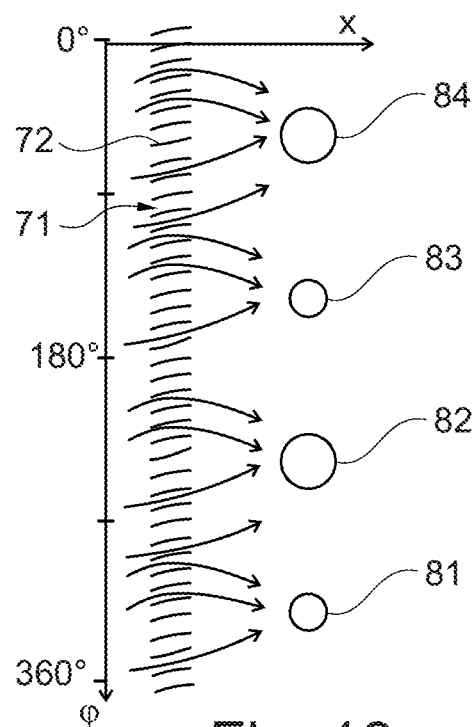
FIG. 16 shows a development of the grid in FIG. 15 consisting of the openings arranged in a ring, along section B-B in FIG. 15.
Figure 17:
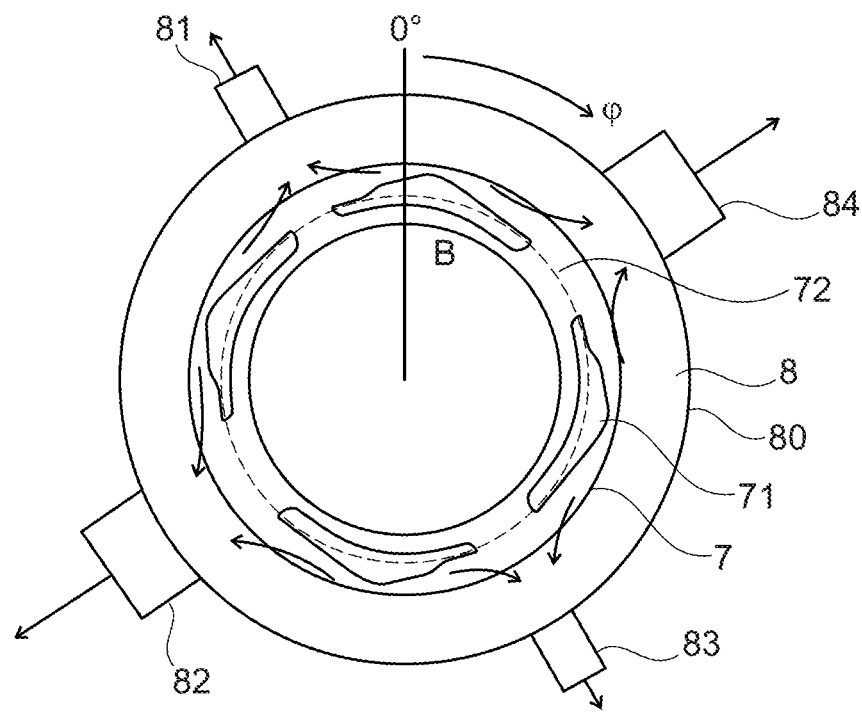
FIG. 17 shows a view along the line A-A in FIG. 14 of an alternative embodiment of the casing flange, illustrating a reduced number of openings arranged in a ring as compared with the embodiment in FIG. 15.
Figure 18:
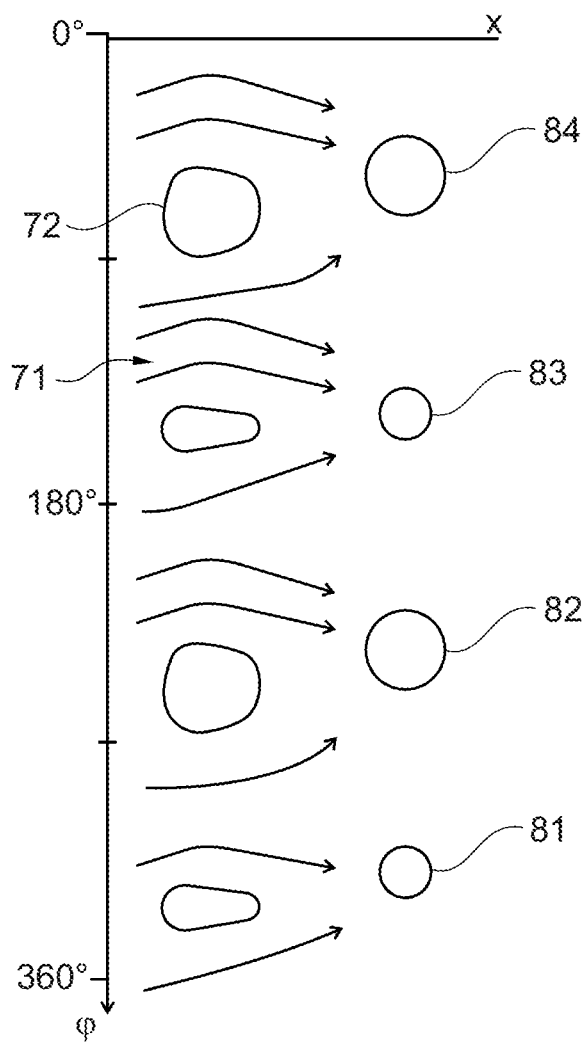
FIG. 18 shows a development of the grid in FIG. 17 consisting of the openings arranged in a ring, along section B-B in FIG. 17.

FIGS. 17 and 18 show a modification of the exemplary embodiment in FIGS. 15 and 16, in which the openings 71 are of wider design and extend over a large angular range in the circumferential direction. In this case, the radial height of the openings 71 can vary within an opening 71. The webs 82, which extend in the circumferential direction between the openings 71, are also of correspondingly wider design. However, the principle of action is the same as in the exemplary embodiment in FIGS. 15 and 16, as can be seen from FIG. 18. The bleed air is fed selectively to individual bleed air extraction points 81-84 via the openings 71, wherein openings which are in a particular circumferential angular range feed the bleed air to an associated bleed air extraction opening. At the same time, the air fed to a particular bleed air extraction opening can be set by means of the size of the openings 71.

In the case of the exemplary embodiment in FIGS. 13 to 18, an annular structure 7 is thus arranged upstream of the collecting volume 8 in the bleed air duct 3, wherein the annular structure 7 uses nonuniform hole sizes over the circumference in order to achieve as uniform as possible extraction of bleed air from the main flow path 1 of the compressor across all extraction rates. In this case, webs 82, the number and circumferential position of which are matched to the bleed air extraction points 81-84, are used in the flange 70 for structural connection of the flange 70 and for flow deflection. The throttling of the flow toward the bleed air extraction points 81-84 is achieved by variation of the outer radius of the openings 71 or of the slot produced by said openings, for example.

The reduction of the through flow area depending on the circumferential position allows adaptation to the static pressure sinks caused by the bleed air extraction points 81-84 and ensures uniform mass flow extraction from the flow path 1 of the compressor. The webs 82 required for the structural task are used in a way which matches the static pressure sinks for additional throttling of the bleed air extraction points 82, 84 with a powerful extraction effect. The transitions are rounded in order to minimize separations of the flow and to reduce buildup effects for the compressor gas path.

It will be understood that the invention is not limited to the embodiments above-described and various modifications and improvements can be made without departing from the concepts described herein. In particular, the configurations of the various exemplary embodiments can also be implemented in combination. The provision of an annular structure with openings as shown in FIGS. 13-18 can additionally be implemented in each of the other exemplary embodiments, for example. It is also possible, for example, to provide for a flow-guiding profile as per FIGS. 2-4 which is implemented in the vane platform to be combined with flow-guiding profiles as per FIGS. 5-12. Attention is furthermore drawn to the fact that—apart from the configurations according to claims 4 to 7—the embodiments of the bleed air extraction system are not restricted to use behind the stator, but can also be used behind the rotor if the bleed air is to be extracted behind the rotor.

Furthermore, except where mutually exclusive, any of the features may be used separately or in combination with any other features, and the disclosure extends to and includes all combinations and sub-combinations of one or more features that are described herein. If ranges are defined, said ranges thus comprise all of the values within said ranges as well as all of the partial ranges that lie in a range.

The invention claimed is:

1. A bleed air extraction device for a turbomachine, comprising:
   an axial compressor, formed in a flow path and having at least one compressor stage, which comprises a rotor and a stator, wherein the flow path is bounded radially on an inside by a radially inner flow path boundary and radially on an outside by a radially outer flow path boundary,
   a bleed air duct configured to guide a bleed air flow branched off from the flow path of the axial compressor, wherein the bleed air duct includes:
   an inlet opening, which is formed downstream of the rotor or the stator of the axial compressor in the radially outer flow path boundary,
   an axially forward wall adjoining the inlet opening, and
   an axially rearward wall adjoining the inlet opening,
   a guide mechanism configured to guide at least a portion of the bleed air flow increasingly in a direction of the axially forward wall of the bleed air duct;
   the guide mechanism including flow-guiding bodies shaped as ribs and positioned on the axially rearward wall of the bleed air duct, the ribs being aligned in the longitudinal direction of the bleed air duct and deflecting the bleed air flow in the bleed air duct increasingly in the direction of the axially forward wall of the bleed air duct, wherein the ribs extend from the axially rearward wall only partially into the bleed air duct and do not extend to the axially forward wall.

2. The device according to claim 1, wherein the guide mechanism is configured to guide the portion of the bleed air flow increasingly in the direction of the axially forward wall of the bleed air duct in such a way that a low-momentum zone which is formed adjoining the inlet opening at the axially forward wall is reduced or dispersed by the portion of the bleed air flow.

3. The device according to claim 1, wherein the guide mechanism is configured to guide the portion of the bleed air flow increasingly in the direction of the axially forward wall of the bleed air duct in such a way that a portion of the portion of the bleed air flow adjacent to the axially forward wall flows parallel to the axially forward.

4. The device according to claim 1, wherein the ribs extend from the axially rearward wall into the bleed air duct and, at the same time, are profiled in such a way that the bleed air flow in the bleed air duct undergoes a greater deflection adjacent to the axially rearward wall than at tips of the ribs.

5. The device according to claim 4, wherein the ribs are profiled in such a way that the bleed air flow in the bleed air duct undergoes no deflection or a relatively slight deflection at the tips of the ribs.

6. The device according to claim 1, wherein the bleed air duct is shaped as an annular gap.

\* \* \* \* \*